3,423,359
SYNTHETIC POLYMER COMPOSITIONS STABILIZED WITH ALKYL THIOBORATES

David W. Young, Hammond, Ill., assignor to Sinclair Research, Inc., New York, N.Y., a corporation of Delaware
No Drawing. Filed Oct. 16, 1963, Ser. No. 316,504
U.S. Cl. 260—45.7
Int. Cl. C08g *51/62;* C08f *45/62;* C07f *5/02*
8 Claims

ABSTRACT OF THE DISCLOSURE

Synthetic polymer compositions having improved antioxidant and thermal stabilized characteristics are provided by incorporating therein an effective, but stabilizing amount, such as 0.1 to 2% by weight of a boron thioalkyl compound. These boron compounds have the structure $$(RS)_3B$$

wherein R is an alkyl radical having 1 to 20 carbon atoms.

There is disclosed a process of preparing these alkyl thioborates by reacting up to a temperature of about 200° C. a boron oxychloride with an alkyl mercaptan of 1–20 carbon atoms.

---

This invention is directed to an improved method for the preparation of boron thioalkyl compounds.

Several methods for the synthesis of boron thioalkyl compounds have been reported in the literature. It is known, for instance, that boron tri(thioalkyl) has been prepared by reacting boron trichloride with organic mercaptans. This method of preparation, however, has not been altogether satisfactory in that the yields of desired product obtained are relatively low, i.e. usually on the order of about 50%. Other preparation methods either suffer from the same yield disadvantages or are unattractive from an economic standpoint due to the laborious process involved, the expense of materials and equipment, excessive formation of undesirable by-products, etc.

I have now discovered a simple and convenient method for preparing boron thioalkyl compounds which can be represented generally by the following formula:

$$(RS)_3B$$

wherein S is sulfur and R is an alkyl radical of 1 to 20 carbon atoms, preferably 1 to 10 carbon atoms in a straight or branched chain. In accordance with the method of the present invention, the oxyhalide salt of the boron is reacted at a temperature up to 250° C., preferably about 75 to 200° C., with an alkylmercaptan containing the number of carbon atoms that corresponds to R in the above formula. For best yields the mole ratio of the alkylmercaptan to the boron oxyhalide employed in the reaction is at least sufficient to satisfy the valence of the boron with alkyl substituents from the alkylmercaptan reactant. Use of an excess of alkylmercaptan required to satisfy the valence of the boron is preferred. The reaction is advantageously conducted in the presence of an inert liquid diluent as, for example, an alkane of 4 to 12 carbon atoms with refluxing of the reactants to insure complete reaction.

The boron oxyhalide reactant of the invention can be prepared by any method known to the art as, for example, the method disclosed in U.S. Patent 2,542,610. A preferred method comprising providing the halide together with a stoichiometric amount of $MgSO_4 \cdot 7H_2O$ in a sealed glass tube and keeping the two materials apart by means of a suitable barrier in the glass tube. After about 40 hours the oxyhalide is obtained. Any of the oxyhalides that can be made are suitable reactants in the method of the present invention. The preferred halogens are F and Cl.

The following example is included to further illustrate the present invention.

EXAMPLE I 0.04 mole boron oxychloride (BOCl) was added directly to a solution of 0.145 mole of n-amyl mercaptan in 25 ml. of decane at 25° C. The resulting solution was refluxed at 100 to 180° C. for about 5 hours. The decane was removed and the reaction mixture was filtered. The filtrate was distilled to provide a 78% yield of $(n-C_5H_{11}S)_3B$ having a boiling point of 170 to 172° C. and a refractive index $n_D^{24}$ of 1.51. Analysis of the product showed the following:

| | |
|---|---|
| Percent C in product | 55.35 |
| Percent H in product | 10.10 |
| Percent B in product | 3.45 |
| Percent S in product | 30.10 |
| M.W. (cryoscopic in benzene) | 312.5 |

The example shows the high yields of the boron tri(thioalkyl) compounds obtained by the method of the present invention.

EXAMPLE II 21 grams (about 0.44 mole) of pure methylmercaptan was added to about 0.13 mole of boron oxychloride in 200 ml. of dry pentane at −78° C. The temperature of the mixture was increased to −40° to −30° C. over a period of two hours. About 12.6 grams of liquid trimethylamine was added at 0° C. and the mixture agitated for four hours. Provision of the trimethylamine is for the purpose of removing any free chlorine. Insoluble trimethylamine hydrochloride was removed by filtration after standing for 15 hours. Distillation of the filtrate yielded propane and about 8.52 grams of trimethyl thioborate having a boiling point of 103° C. at 18 mm.

The boron thioalkyl compounds prepared by the method of the invention have utility in a number of applications, for example, as catalysts in the preparation of amides by the reaction of carboxylic acids with amines. It has now been found that incorporating small effective amounts of the boron thioalkyl compounds into synthetic polymeric materials provides a composition having improved antioxidant or thermal stability characteristics.

The synthetic polymeric materials including homopolymers, copolymers and interpolymers to which the additives are incorporated are well-known resin polymers and have Staudinger molecular weights of at least 1,000 up to 300,000 or even 1,000,000 or more. They are obtained by a variety of polymerization procedures including, for example, emulsion polymerization of the styrenes, the conjugated butadiene hydrocarbons, isoprene, dimethylbutadiene, ethylene, isobutene, chloroprene, etc., which may be polymerized with one another, or with other compounds containing a vinyl group, such as acrylonitrile, methyl acrylate, etc. The synthetic materials can be non-rubbery in nature, for instance, synthetic hydrocarbon polymers such as polyethylene, polypropylene, polystyrene, etc. or rubber-like, and often the polymers are hydrocarbons. Suitable rubber-like compositions which may be utilized in accordance with this invention thus include isobutylene-isoprene copolymers, butadiene-styrene copolymers, polybutadiene, butadiene-acrylonitrile copolymers, chloroprene polymers and isoprene polymers, all of which may be prepared under conditions well known in the art.

The boron thioalkyl additive of this invention can be added to the synthetic polymeric materials, which constitute the major amount of the composition of the invention, by simply mixing or blending at elevated temperature and is incorporated in amounts sufficient to significantly improve thermal stability or antioxidant properties of the synthetic polymeric materials. The actual amount incorporated in any given instance will vary depending on the particular polymeric material selected boron. In general, the additive of the invention is added in amounts of about .01 to 5%, preferably about 0.1 to 2% by weight based on the synthetic material.

In addition to the boron compounds of the invention, the synthetic materials can contain numerous other components commonly blended and processed with the polymeric substances to obtain other desired characteristics such as high tensile strength, high elastic limit, high elongation and good flexure, etc. The various components commonly used include vulcanizing agents, accelerators, accelerator activators, anti-ozonants, reinforcing fillers, extending agents, pigment softeners, plasticizers, extruding agents, peptizers and miscellaneous materials for imparting special properties.

The following examples are included to illustrate the improved thermal stability and anti-oxidant properties of the present invention.

EXAMPLE III

Butyl rubber (a copolymer of 97 parts isobutylene and 3 parts isoprene) having a molecular weight of 37,000 was admixed with 0.25% $(n-C_5H_{11}S)_3B$. The butyl rubber was prepared in the laboratory to be sure that the rubber was free of commercial additives. The butyl rubber containing the $(n-C_5H_{11}S)_3B$ additive was placed in a dark air oven maintained at a temperature of 110° C. Another piece of the butyl rubber containing no additive was likewise placed in the oven. In a similar manner another butyl rubber sample containing 0.25% of 2,6-di-tertiary butyl-4-methyl phenol (additive employed commercially as a heat stabilizer and antioxidant for butyl rubber) was also placed in the oven. Staudinger molecular weights were determined before or after the aging. The results are reported in the Table I below.

TABLE NO. I

| Product | Percent additive | Time in oven (hours) | Staudinger, mol. wt. |
|---|---|---|---|
| Butyl rubber raw | 0.0 | 0 | 37,000 |
| Do | 0.0 | 62 | 21,000 |
| Do | 0.0 | 104 | 9,000 |
| +tri n-amyl thioborate | 0.25 | 0 | 37,100 |
| Do | 0.25 | 62 | 35,000 |
| Do | 0.25 | 150 | 33,000 |
| +2,6-di-t-butyl-4-methylphenol | 0.25 | 0 | 37,000 |
| Do | 0.25 | 62 | 34,000 |
| Do | 0.25 | 151 | 15,500 |

The data of the table demonstrate the advantageous thermal stability characteristics (as measured by the decrease in molecular weight) provided the rubber by the $(n-C_5H_{11}S)_3B$ additive of the invention.

EXAMPLE IV

The tri-n-amyl thioborate of Example I was tested for antioxidant effectiveness in rubbery polyisobutene having an approximate Staudinger molecular weight of about 105,000. The results including control tests are given in Table II below. The blank or control polymer, as well as the test product, were all milled at 185 to 200° F. on a micro rubber mill for eight minutes and then placed in test. 0.25 weight percent of the tri-n-amyl thioborate additive was employed. The test comprised placing the test polymer in the form of small pieces on a watch glass and then passing the test sample into an oven maintained at 110° C. for a period of 30 days. At the end of this period, the loss in molecular weight was determined. For comparison, 0.25 weight percent of two commercial antioxidants (sulfur and phenyl-β-naphthylamine) were similarly tested. The results of the tests are shown in Table II. Comparison of the color and molecular weight loss of the products reveals that the tri-n-amyl thioborate additive provided the polyisobutylene with superior thermal stability characteristics over those demonstrated by the commercial anti-oxidants.

TABLE II

| Material Tested as Anti-Oxidant | Properties of agent polymers | |
|---|---|---|
| | Color | Percent M. wt. lost |
| None | Water-white | 88 |
| Sulfur | do | 17 |
| Phenyl-beta-naphthylamine | Black | 5 |
| n-Amyl thioborate | Water-white | 4 |

EXAMPLE V

The tri-n-amyl thioborate of Example I was tested for anti-oxidant effectiveness in polyethylene having a molecular weight of 20,000. The test employed was an oxidation absorption test which comprises subjecting the test sample to oxidation at a temperature of 140° C. and periodically measuring the oxygen uptake in cc. per gram of polyethylene utilized. For comparison, a blank polymer and the polymer containing 0.125% of the tri-n-amyl thioborate were both tested. Results of the test are shown in Table III.

TABLE III.—OXYGEN UPTAKE IN CC. PER GRAM OF 20,000 M. Wt. POLYETHYLENE

[Oxidation rate of a branched polyethylene at 140° C.]

| Time in hours | Oxygen uptake in cc. per gram of polyethylene | |
|---|---|---|
| | Blank Polymer | Polymer+0.125% n-amyl thioborate |
| 10.0 | 8 | 7.5 |
| 25.0 | 84 | 87 |
| 50.0 | 155 | 123 |
| 75.0 | 243 | 145 |
| 100.0 | 318 | 152 |

The data of Table III show that for the first 25 hours of oxidation, the polyethylene containing the additive of the present invention oxidized as rapidly at 135 to 140° C. as the blank polymer. However, after longer periods of oxidation, for instance after 25 hours, the oxidation rate of the additive-containing polymer significantly decreases compared to that of the blank polymer.

I claim:

1. A composition of improved thermal stability consisting essentially of a major amount of a synthetic resin polymer obtained by polymerizing monomer selected from the group consisting of styrene, ethylene, propylene, isobutene, conjugated butadiene, isoprene, chloroprene, and dimethyl butadiene with one another or with other compounds which contain a vinyl group, and a small amount of an additive having the general formula:

$(RS)_3B$ where R is an alkyl group of from 1 to 20 carbon atoms, said minor amount being sufficient to improve the thermal stability of the synthetic polymeric material.

2. The composition of claim 1 in which the synthetic resin polymer has a molecular weight of about 1000 to 1,000,000.

3. The compostion of claim 1 in which the synthetic resin polymer is rubbery polymer of isobutylene and isoprene.

4. The composition of claim 1 in which the synthetic resin polymer is rubbery polymer of isobutylene.

5. The composition of claim 1 in which the synthetic resin polymer is polyethylene.

6. The composition of claim 1 in which R has 1 to 10 carbon atoms.

7. The composition of claim 6 in which R is n-amyl.

8. The composition of claim 1 wherein the amount of additive is about 0.1 to 2% by weight.

References Cited

UNITED STATES PATENTS

| | | | |
|---|---|---|---|
| 2,310,449 | 8/1939 | Lightbown et al. | 260—93 |
| 2,466,301 | 4/1949 | Haworth et al. | 260—30.8 |
| 2,695,910 | 10/1954 | Asseff et al. | 260—413 |
| 2,888,435 | 5/1959 | Wallace | 260—45.75 |
| 2,963,434 | 12/1960 | Millikan et al. | 252—42.7 |
| 3,159,599 | 12/1964 | Meek | 260—45.75 |
| 2,394,484 | 3/1966 | Stark | 260—45.9 |
| 3,251,792 | 5/1966 | Homberg | 260—23 |
| 3,129,239 | 4/1964 | Lang | 260—462 |

FOREIGN PATENTS

| | | |
|---|---|---|
| 936,770 | 9/1963 | Great Britain. |
| 1,896,196 | 5/1962 | Great Britain. |

OTHER REFERENCES

Hackh's Chemical Dictionary, 3rd ed., p. 139, McGraw-Hill Co. Inc., 1944.

DONALD E. CZAJA, *Primary Examiner.*

V. P. HOKE, *Assistant Examiner.*

U.S. Cl. X.R.

260—462

UNITED STATES PATENT OFFICE
CERTIFICATE OF CORRECTION

Patent No. 3,423,359  
January 21, 1969

David W. Young

It is certified that error appears in the above identified patent and that said Letters Patent are hereby corrected as shown below:

Column 1, line 67, before "halide" insert -- boron --. Column 3, line 4, cancel "boron". Column 6, line 3, "1,896,196" should read -- 896,196 --.

Signed and sealed this 7th day of April 1970.

(SEAL)  
Attest:

Edward M. Fletcher, Jr.  
Attesting Officer

WILLIAM E. SCHUYLER, JR.  
Commissioner of Patents